United States Patent
Bond, Jr. et al.

(10) Patent No.: US 9,890,890 B2
(45) Date of Patent: Feb. 13, 2018

(54) HIGH PRESSURE PIPE AND FITTING RESTRAINT SYSTEM

(71) Applicant: GULFSTREAM SERVICES, INC., Houma, LA (US)

(72) Inventors: Robert Bond, Jr., Houma, LA (US); Michael Mire, Kenner, LA (US)

(73) Assignee: Gulfstream Services, Inc., Houma, LA (US)

( * ) Notice: Subject to any disclaimer, the term of this patent is extended or adjusted under 35 U.S.C. 154(b) by 400 days.

(21) Appl. No.: 14/173,194

(22) Filed: Feb. 5, 2014

(65) Prior Publication Data

US 2014/0217761 A1   Aug. 7, 2014

Related U.S. Application Data

(60) Provisional application No. 61/760,956, filed on Feb. 5, 2013.

(51) Int. Cl.
*F16L 55/00*    (2006.01)
*F16L 13/04*    (2006.01)
*F16L 57/00*    (2006.01)
*F16L 3/26*     (2006.01)
(Continued)

(52) U.S. Cl.
CPC ............. *F16L 55/005* (2013.01); *F16L 3/14* (2013.01); *F16L 3/26* (2013.01); *F16L 13/04* (2013.01); *F16L 35/00* (2013.01); *F16L 57/00* (2013.01)

(58) Field of Classification Search
CPC ......... F16L 55/005; F16L 35/00; F16L 13/04; F16L 3/14; F16L 3/26; F16L 57/00

USPC ............... 285/117, 114, 81; 138/107, 108; 137/377, 343; 24/115 K, 122.6, 135 R, 24/335
See application file for complete search history.

(56) References Cited

U.S. PATENT DOCUMENTS

| 2,746,773 A |   | 5/1956 | Bily |
| 3,197,240 A | * | 7/1965 | Lindberg ............. F16L 55/005 24/115 R |

(Continued)

FOREIGN PATENT DOCUMENTS

| EP | 167425 A | * | 1/1986 | |
| GB | 2157757 A | * | 10/1985 | ............... A61D 1/08 |

(Continued)

OTHER PUBLICATIONS

PCT Notification of Transmittal of the International Search Report and the Written Opinion of the International Searching Authority, dated Jun. 19, 2014.

(Continued)

*Primary Examiner* — Babajide A Demuren
(74) *Attorney, Agent, or Firm* — Garvey, Smith & Nehrbass, Patent Attorneys, L.L.C.; Charles C. Garvey, Jr.; Julie R. Chauvin

(57) ABSTRACT

A restraint system for use in securing temporary flow lines that include multiple pipe sections, each pair of pipe sections connected together with a fitting or coupling such as a hammer joint coupling. The system includes multiple pluralities of endless loop slings connected end to end with a cow hitch or girth hitch knot. Disconnectable fittings (e.g., shackles) are placed every three or more slings so that easy disassembly is afforded in case of leakage or other failure.

16 Claims, 16 Drawing Sheets

(51) Int. Cl.
*F16L 35/00* (2006.01)
*F16L 3/14* (2006.01)

(56) References Cited

U.S. PATENT DOCUMENTS

| | | | | |
|---|---|---|---|---|
| 3,360,838 A * | 1/1968 | Comer | ................ | D02G 1/0266 28/154 |
| 3,859,692 A * | 1/1975 | Waterman | ............ | F16L 55/005 24/300 |
| 4,333,675 A * | 6/1982 | Wirkkala | ................ | B66C 1/12 24/122.6 |
| 4,484,962 A * | 11/1984 | Dienes | .................. | H02G 15/08 156/313 |
| 4,549,332 A * | 10/1985 | Pouliot | ................ | F16L 55/005 24/115 H |
| 4,553,635 A * | 11/1985 | Johnson | ................ | A01M 31/02 182/187 |
| 4,890,363 A * | 1/1990 | Cross | .................... | F16L 55/005 24/129 R |
| 5,507,533 A * | 4/1996 | Mumma | ............... | F16L 55/005 285/114 |
| 5,689,862 A | 11/1997 | Hayes et al. | | |
| 5,873,608 A * | 2/1999 | Tharp | .................... | F16L 55/005 285/114 |
| 6,192,558 B1 * | 2/2001 | Badura | .................. | F16B 45/02 24/599.1 |
| 6,298,882 B1 | 10/2001 | Hayes et al. | | |
| 6,481,457 B2 * | 11/2002 | Hayes | .................. | F16L 55/005 137/377 |
| 6,596,015 B1 * | 7/2003 | Pitt | .................... | A61B 17/0469 606/232 |
| 6,837,523 B2 | 1/2005 | Surjaatmadja et al. | | |
| 7,802,823 B2 * | 9/2010 | Piantoni | ................ | F16L 55/005 285/114 |
| 8,689,534 B1 * | 4/2014 | Chou | ..................... | F16G 15/12 59/78 |
| 2002/0095165 A1 * | 7/2002 | Chan | ................. | A61B 17/0469 606/148 |
| 2003/0036345 A1 * | 2/2003 | Conner | .................... | A22B 5/06 452/187 |
| 2010/0077718 A1 * | 4/2010 | Wienke | ............ | A61B 17/06166 59/84 |
| 2010/0263760 A1 * | 10/2010 | Gayaut | ..................... | F16L 3/18 138/107 |
| 2013/0248004 A1 * | 9/2013 | Money | .................. | F16L 55/005 137/15.08 |
| 2013/0319565 A1 * | 12/2013 | St. Germain, Jr. | ....... | F16L 3/04 138/106 |
| 2013/0341470 A1 * | 12/2013 | Lee | ........................ | F16L 55/005 248/68.1 |
| 2014/0145428 A1 * | 5/2014 | Meadows | ................ | F16L 35/00 285/117 |

FOREIGN PATENT DOCUMENTS

| | | | | |
|---|---|---|---|---|
| GB | 2439550 A * | 1/2008 | ............ | F16L 55/005 |
| SU | 286410 A1 | 11/1970 | | |
| WO | WO 2013184521 A1 * | 12/2013 | ............. | F16L 57/00 |

OTHER PUBLICATIONS

Stromberg, J.L., SPE 24619, Restraining System to Help Contain Well Flowlines and Equipment During Rupture for Increased Safety, SPE Annual Technical Conference and Exhibition, dated Oct. 4-7, 1992, Washington, D.C.

* cited by examiner

US 9,890,890 B2

HIGH PRESSURE PIPE AND FITTING RESTRAINT SYSTEM

CROSS-REFERENCE TO RELATED APPLICATIONS

This application claims the benefit of U.S. Provisional Patent Application Ser. No. 61/760,956, filed 5 Feb. 2013, which is hereby incorporated herein by reference.

Priority of U.S. Provisional Patent Application Ser. No. 61/760,956, filed 5 Feb. 2013, which is incorporated herein by reference, is hereby claimed.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to devices for restraining high pressure pipeline or flow lines. More particularly, the present invention relates to a method and apparatus for restraining high pressure pipe and fittings wherein a series of endless loop slings are joined end to end with hitch type connections (such as a cow hitch, sling hitch, lanyard hitch or other like knot) and wherein each of first and second lengths of assembled slings are connected end to end with disconnectable connections (e.g., shackles) that enable service or maintenance of a selected section of the high pressure piping system without disassembly of all of the endless loop slings, and wherein the assembly of slings and connectors is knotted to the pipeline (e.g., with half hitch knots) at selected intervals.

2. General Background of the Invention

In the offshore oil and gas industry, temporary high pressure pipelines are often employed at or near a drilling platform or drilling rig or upon a deck of a drilling platform or drilling rig. These high pressure pipelines are assembled using couplings which are also high pressure rated. If one of these sections of pipe or coupling that make up the high pressure flow line fail or leak, the pipe can violently move, potentially causing injury or death to personnel and/or damage to equipment.

Patents have issued for restraint systems designed to restrain a flow line or parts thereof. The following are examples of such patents:

U.S. Pat. Nos. 2,746,773; 5,689,862; 6,481,457 (each patent is hereby incorporated herein by reference).

The '457 patent is directed to a "Safety Restraint Assembly for High Pressure Flow Line". The patent is owned by S.P.M. Flow Controls, Inc. of Fort Worth, Tex. (hereinafter "S.P.M.").

A Society of Petroleum Engineers publication which is identified by the numeral SPE 24619 and entitled "Restraining System to Help Contain Well Flow Lines and Equipment During Rupture for Increased Safety" was said to have been prepared for presentation at the 87th Annual Technical Conferences and Exhibition of the Society of Petroleum Engineers held in Washington, D.C., Oct. 4-7, 1992.

BRIEF SUMMARY OF THE INVENTION

The present invention provides a restraint system for use in securing temporary flow lines that include multiple pipe sections, each pair of sections connected together with a fitting such as a pressure holding coupling (e.g., a hammer union or coupling).

The present invention thus provides a restraint system for use in securing temporary flowlines that include multiple pipe sections, each pair of pipe sections connected together with fittings. The system includes an assembly of loop slings (preferably endless loop slings) connected end-to-end, each sling having end portions that are secured to one or more other endless slings.

Disconnectable fittings join one assembly of multiple slings to another assembly of multiple slings.

The disconnectable fitting is not a part of a sling.

In one embodiment, the disconnectable fitting can be a shackle.

In one embodiment, each endless sling is wrapped around the piping system at least one 360° wrap.

In one embodiment, there are at least three endless loop slings in each assembly.

In one embodiment, each endless loop sling assembly encircles a pipe section next to a fitting.

The present invention provides a method for restraining a temporary flow line that includes multiple pipe sections, each pair of sections connected together with a disconnectable coupling.

The method provides first and second pluralities of connected endless sling loops, each plurality including at least three endless loop slings connected end to end with a cow hitch, girth hitch or sling hitch or other hitch knot.

The endless loop slings are connected end to end and connecting each plurality to another plurality with a disconnectable connector.

In one embodiment, the disconnected connector is not a part of an endless sling.

In one embodiment, the connector is metallic.

In one embodiment, the connector is a shackle.

In one embodiment, the connector is a fitting having two parts, one part that disconnects from the other part.

The present invention provides a restraint system for use in securing temporary flowlines that include multiple pipe sections, each pair of sections connected together with fittings. An assembly of endless loop slings are connected end-to-end, each sling having end portions that are secured to one or more other endless slings.

Disconnectable fittings join one assembly of multiple endless slings to another assembly of multiple endless slings;

The disconnectable fitting is not a part of an endless loop sling.

The assembly of flowlines is connected at intervals to the pipe sections and fittings using knotted connectors.

In one embodiment, the disconnectable fitting is a shackle.

In one embodiment, each endless sling is tied to the piping system with half hitch knots.

In one embodiment, there are between 2 and 12 endless loop slings in each assembly.

In one embodiment, each endless loop sling assembly is tied to a pipe section next to a fitting.

The present invention provides a method for restraining a temporary flow line that includes multiple pipe sections, each pair of sections connected together with a disconnectable coupling, the system providing first and second pluralities of connected endless sling loops.

Each plurality includes at least three endless loop slings connected end to end with a knotted connection.

The slings are connected end to end connecting each plurality to another plurality with a disconnectable connector.

The slings are knotted to the flow line at intervals using half hitch or other knotted connections.

In one embodiment, the disconnected connector is not a part of an endless sling.

In one embodiment, the connector is metallic.

In one embodiment, the connector is a shackle.

In one embodiment, the connector is a fitting having two parts, one part that disconnects from the other part. In one embodiment the two parts are a shackle bow and a shackle pin.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein.

DETAILED DESCRIPTION OF THE INVENTION

Figure 1:
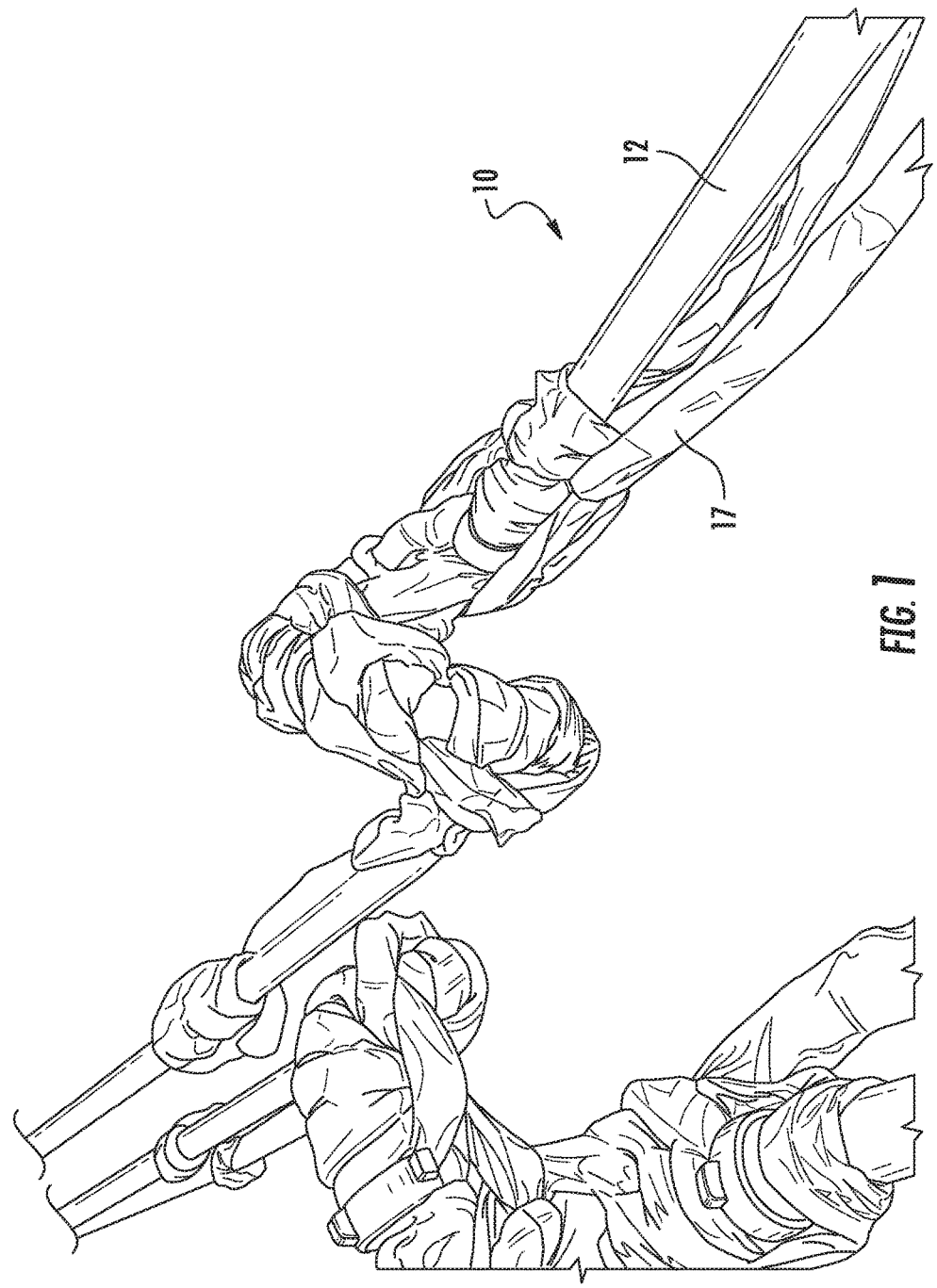
FIGS. 1-15 are views of a preferred embodiment of the apparatus of the present invention.
Figure 2:
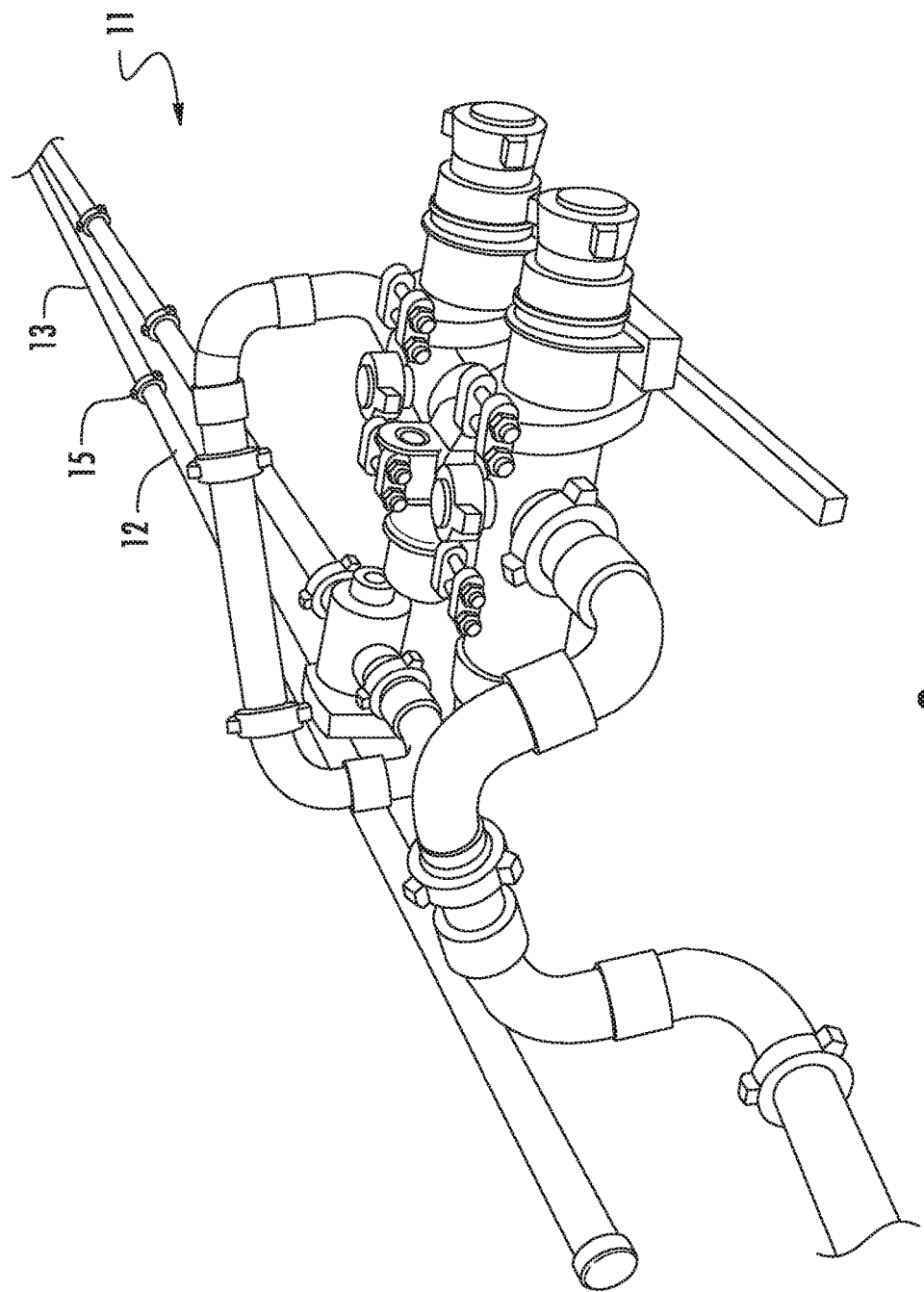
Figure 3:
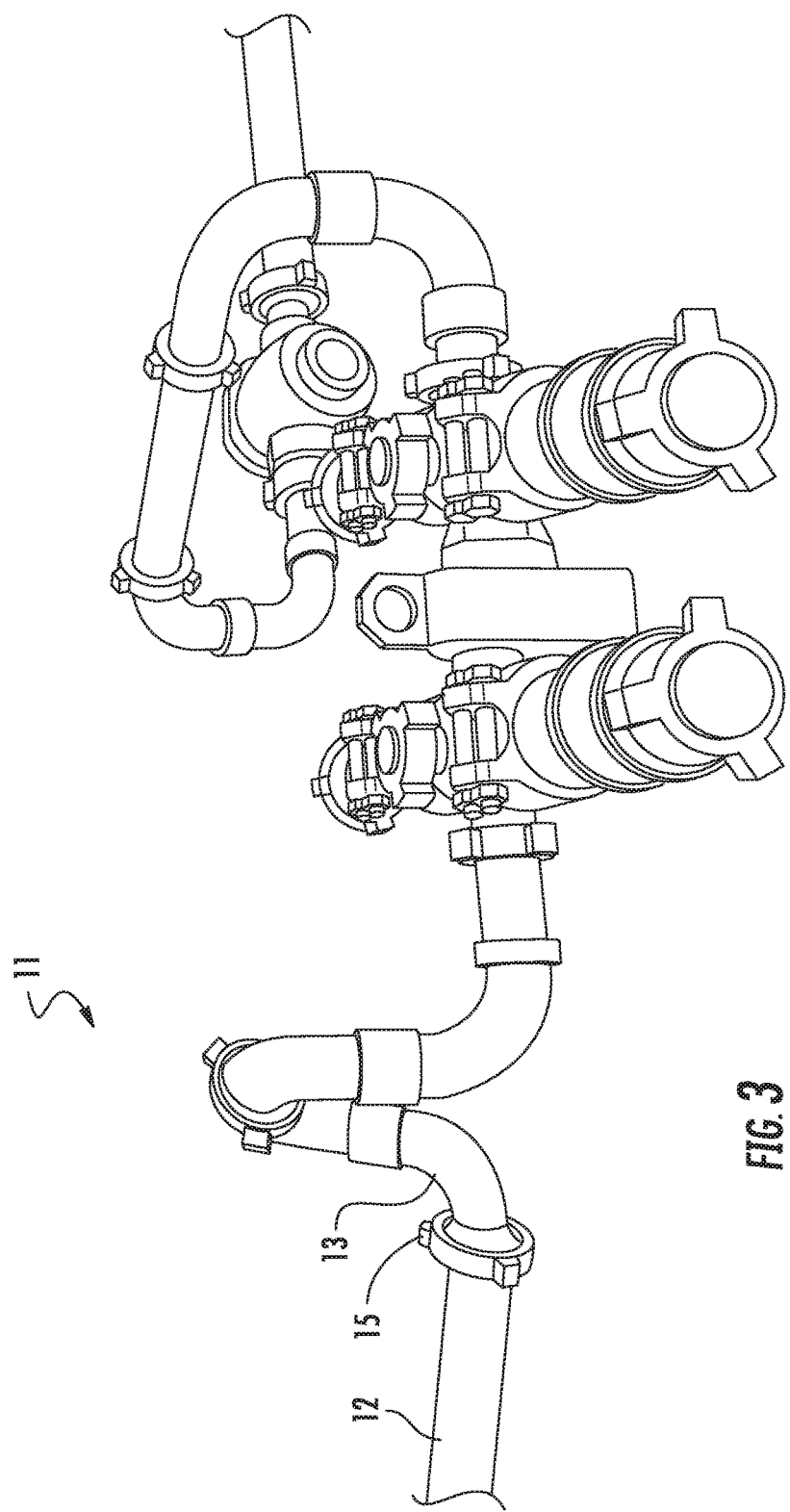
Figure 4:
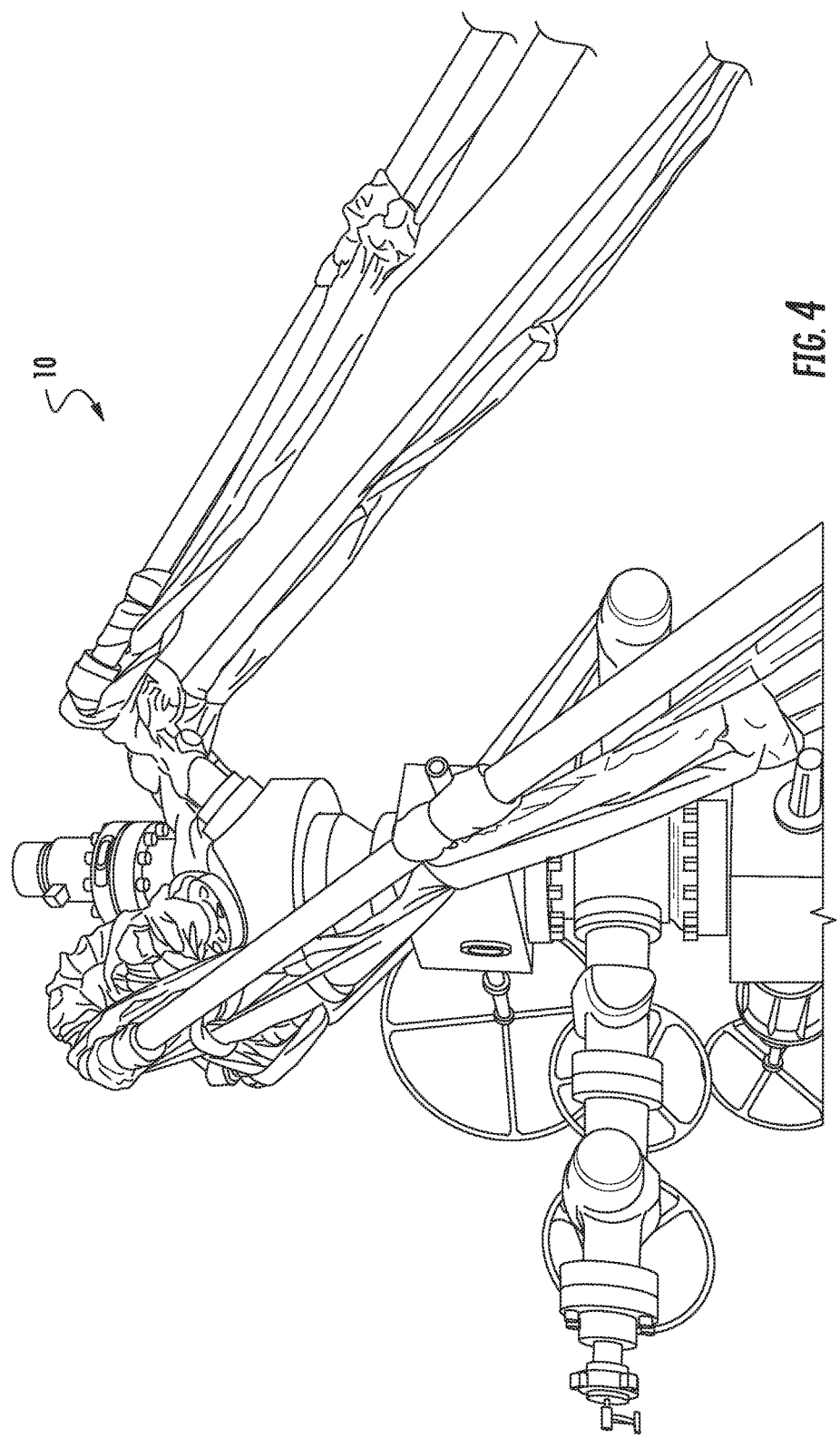
Figure 5:
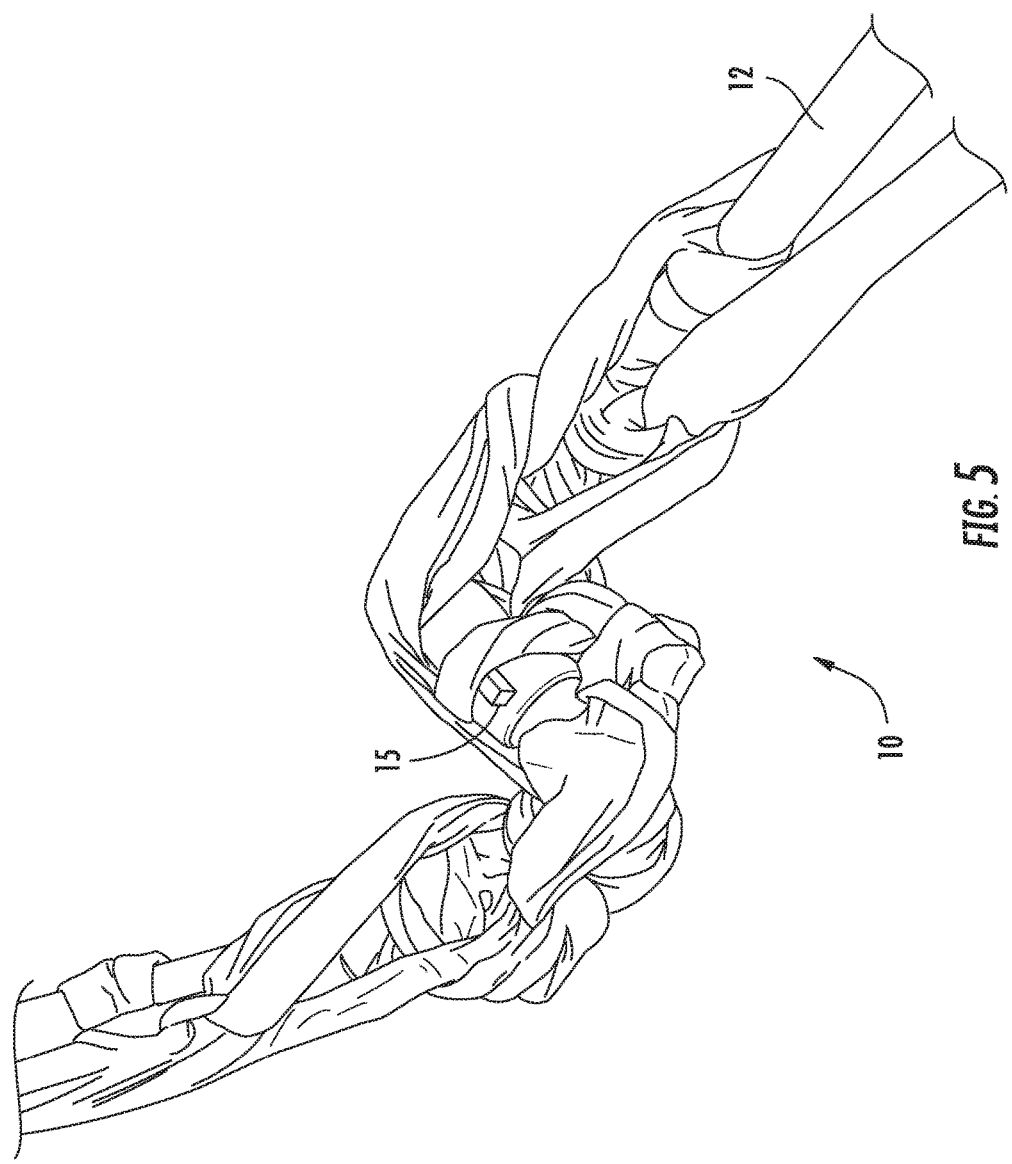
Figure 6:
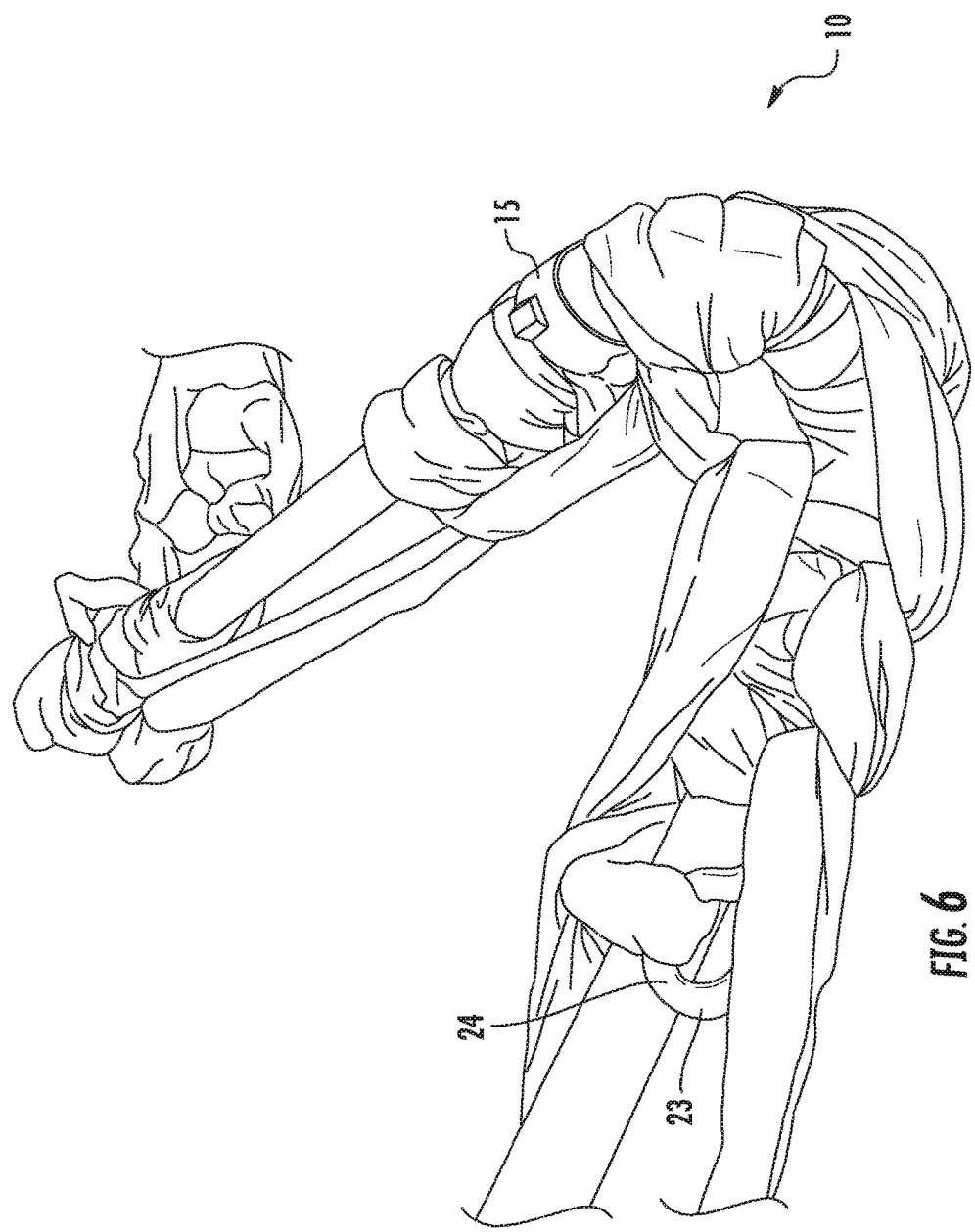
Figure 7:
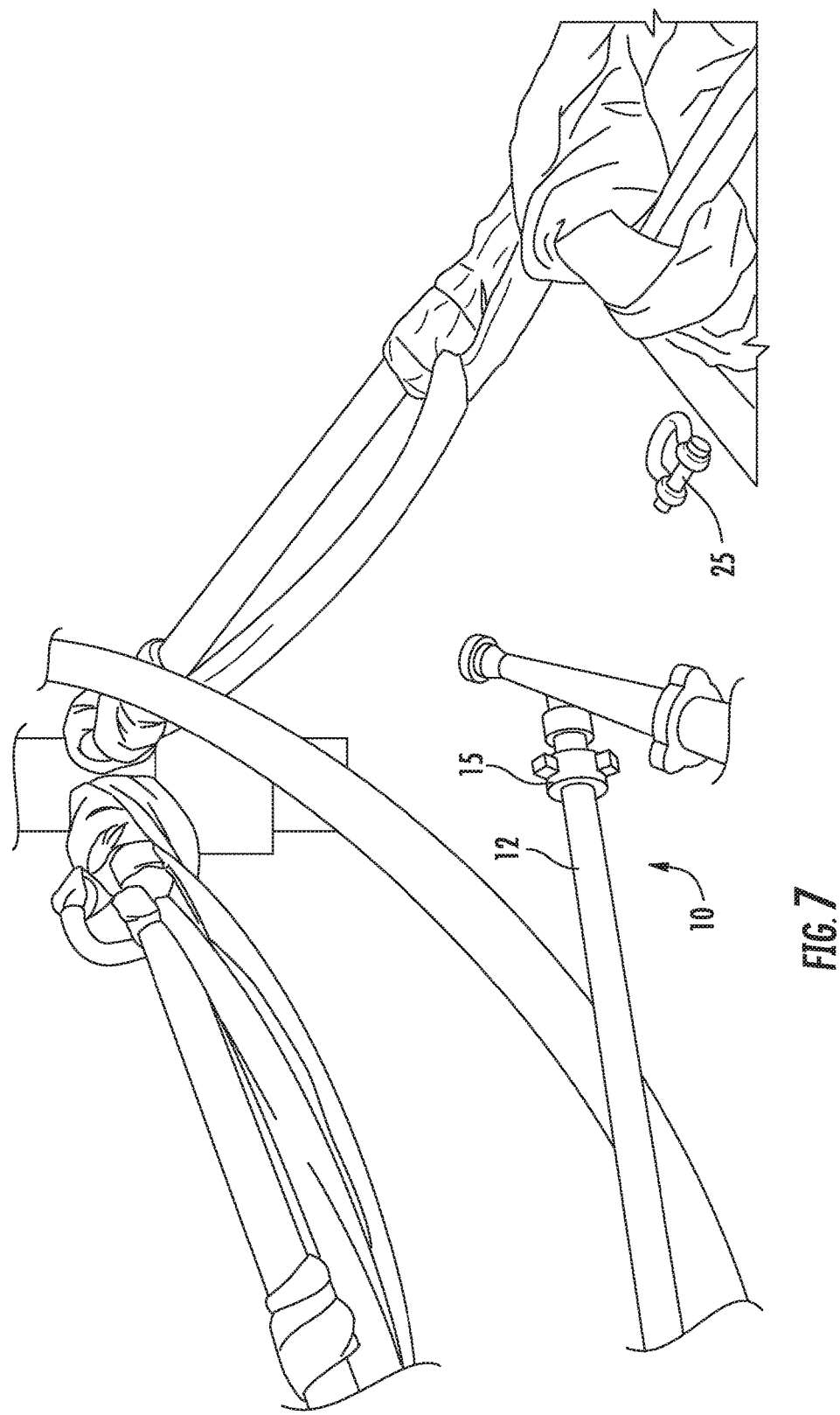
Figure 8:
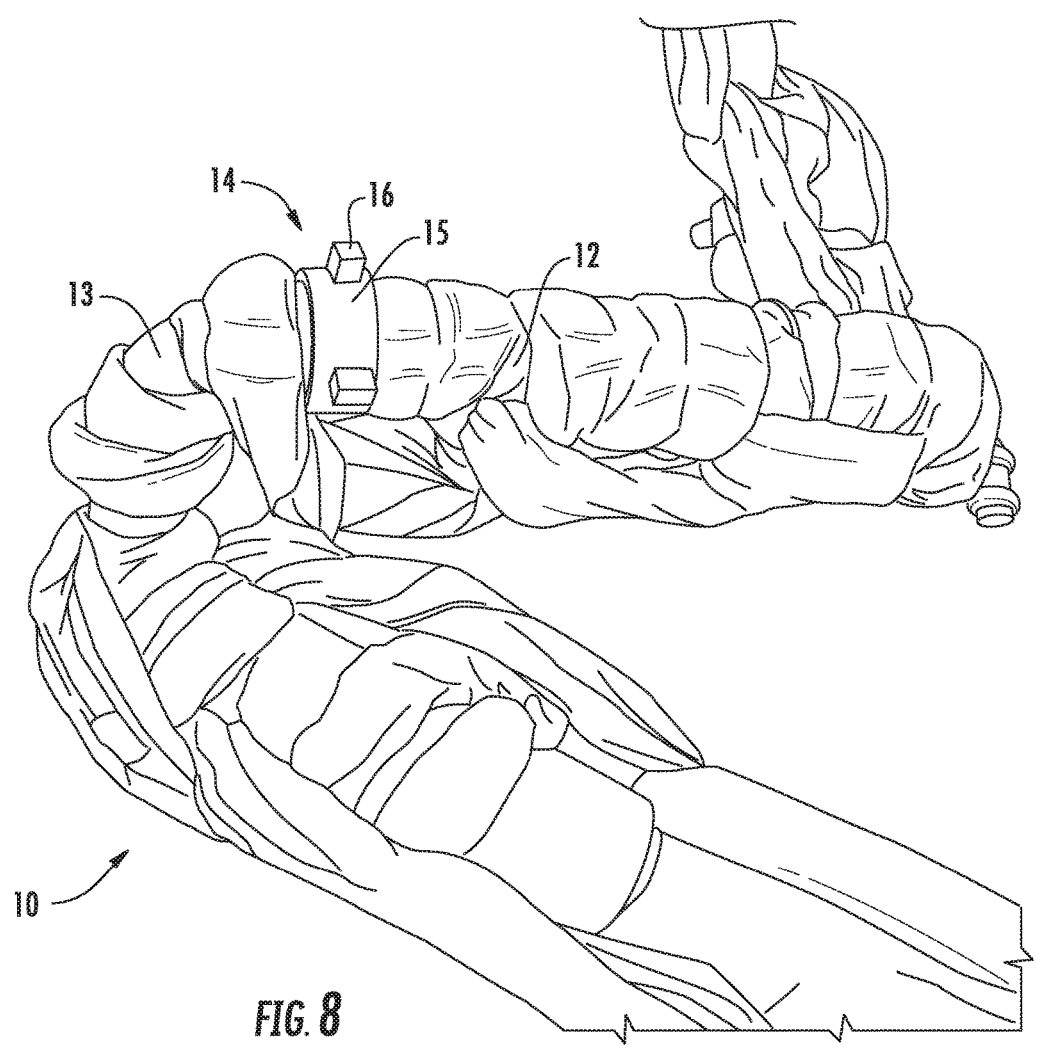
Figure 9:
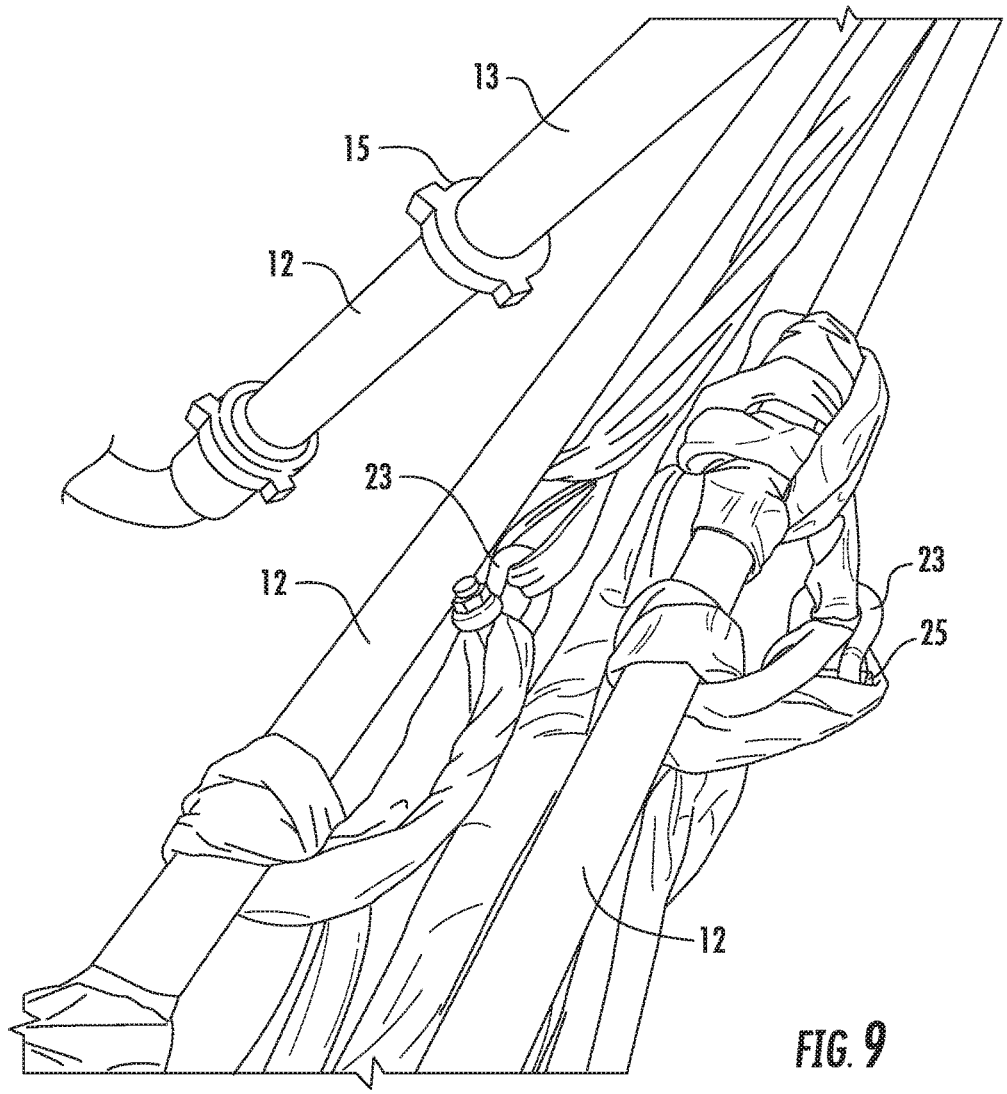
Figure 10:
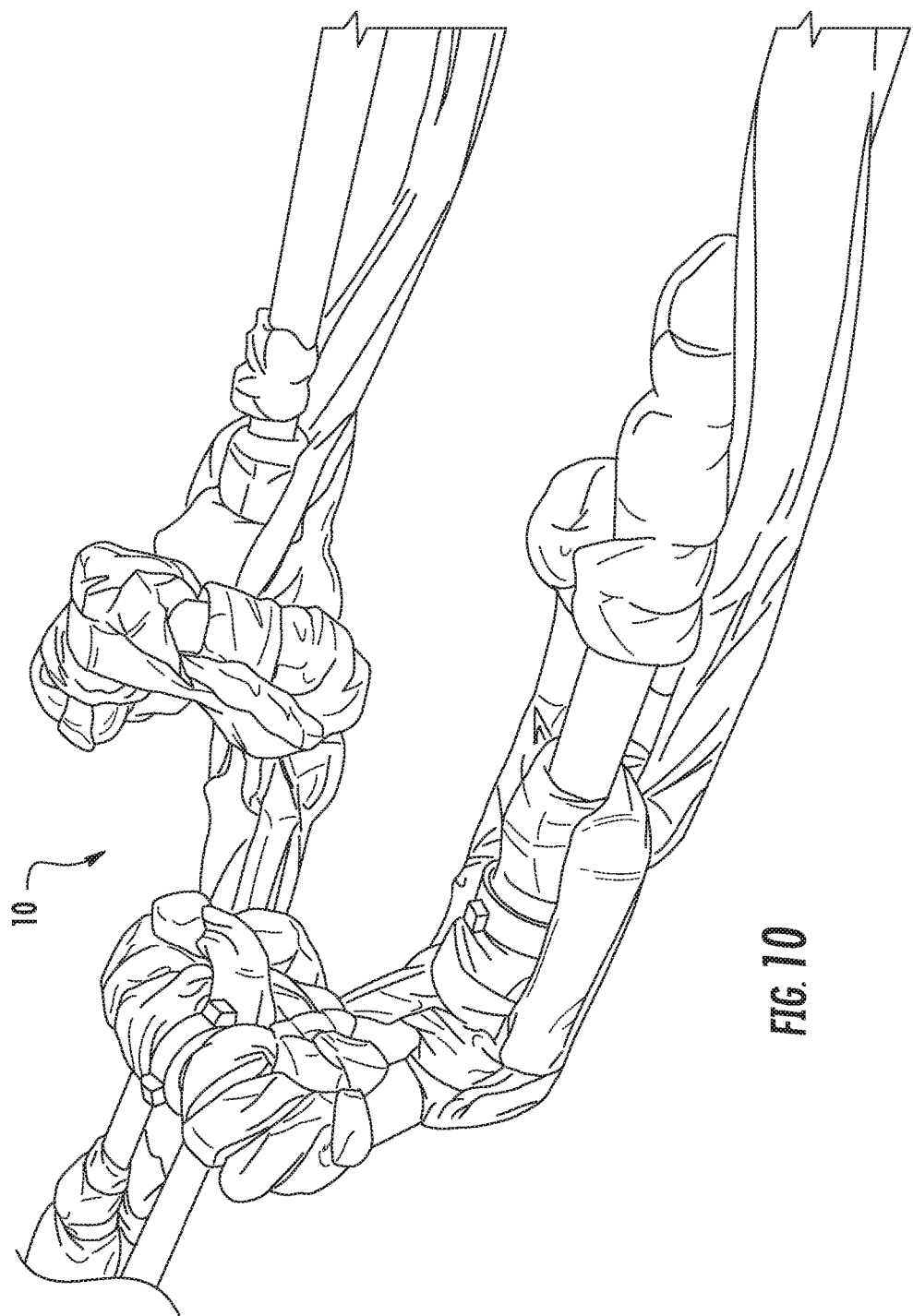
Figure 11:
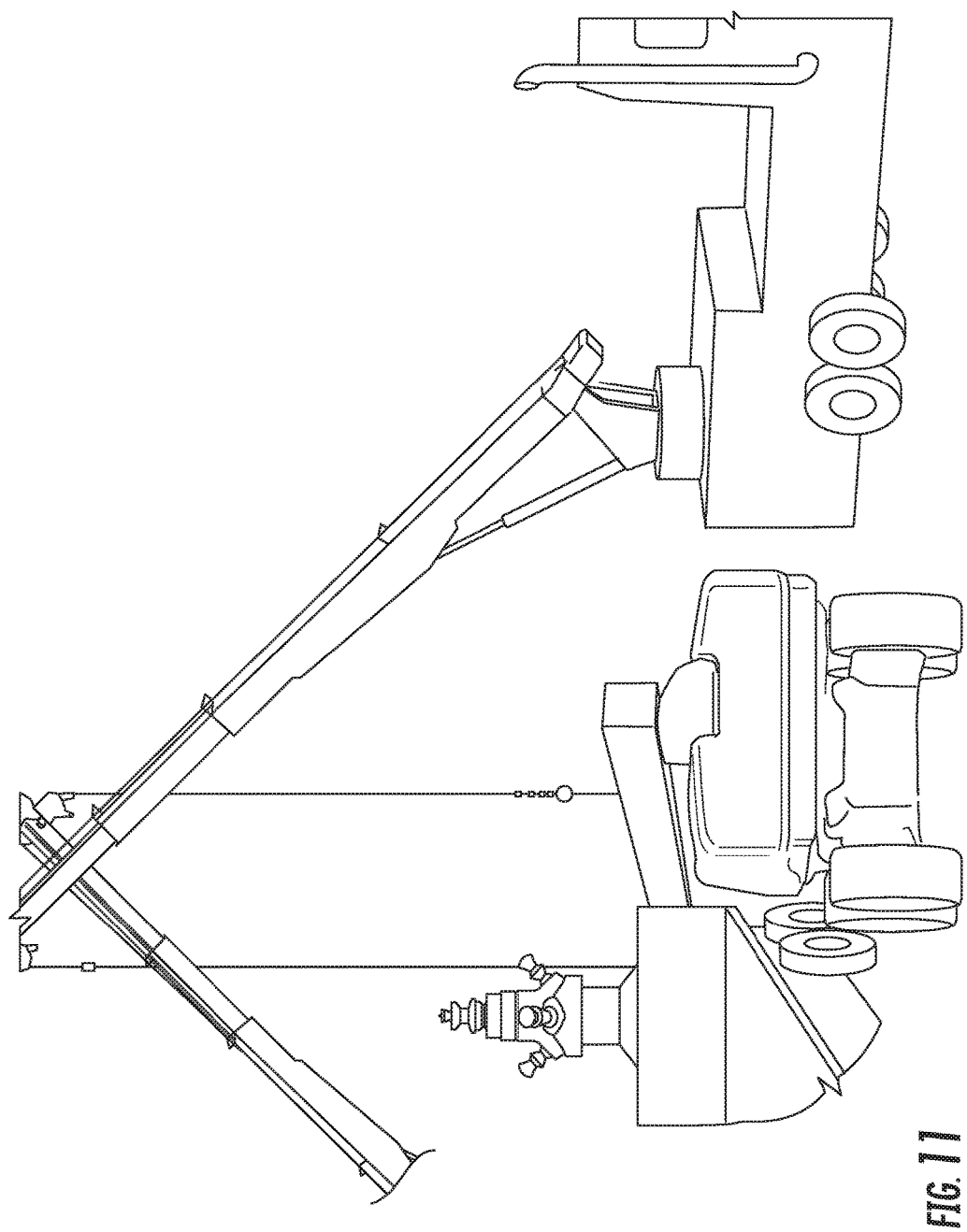
Figure 12:
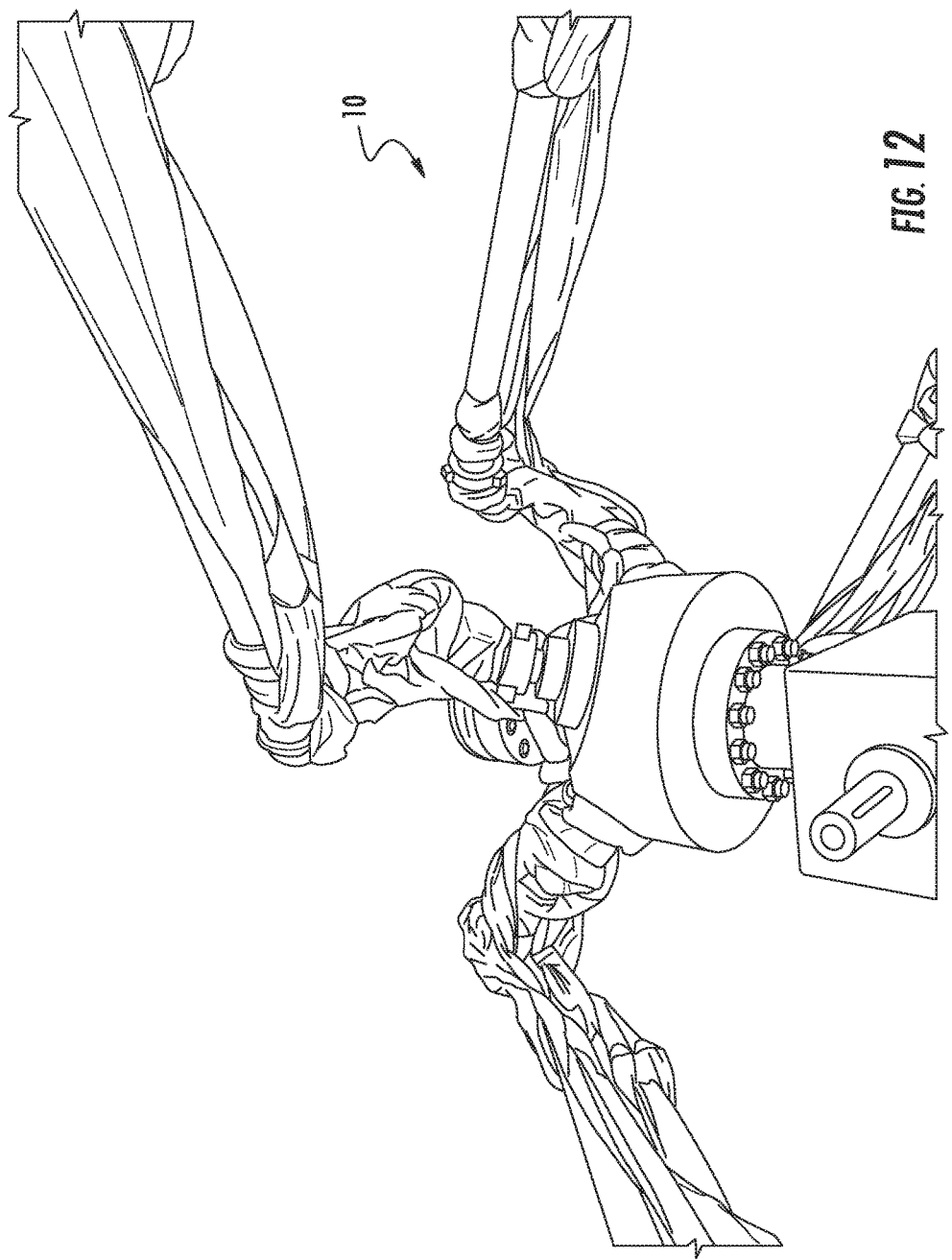
Figure 13:
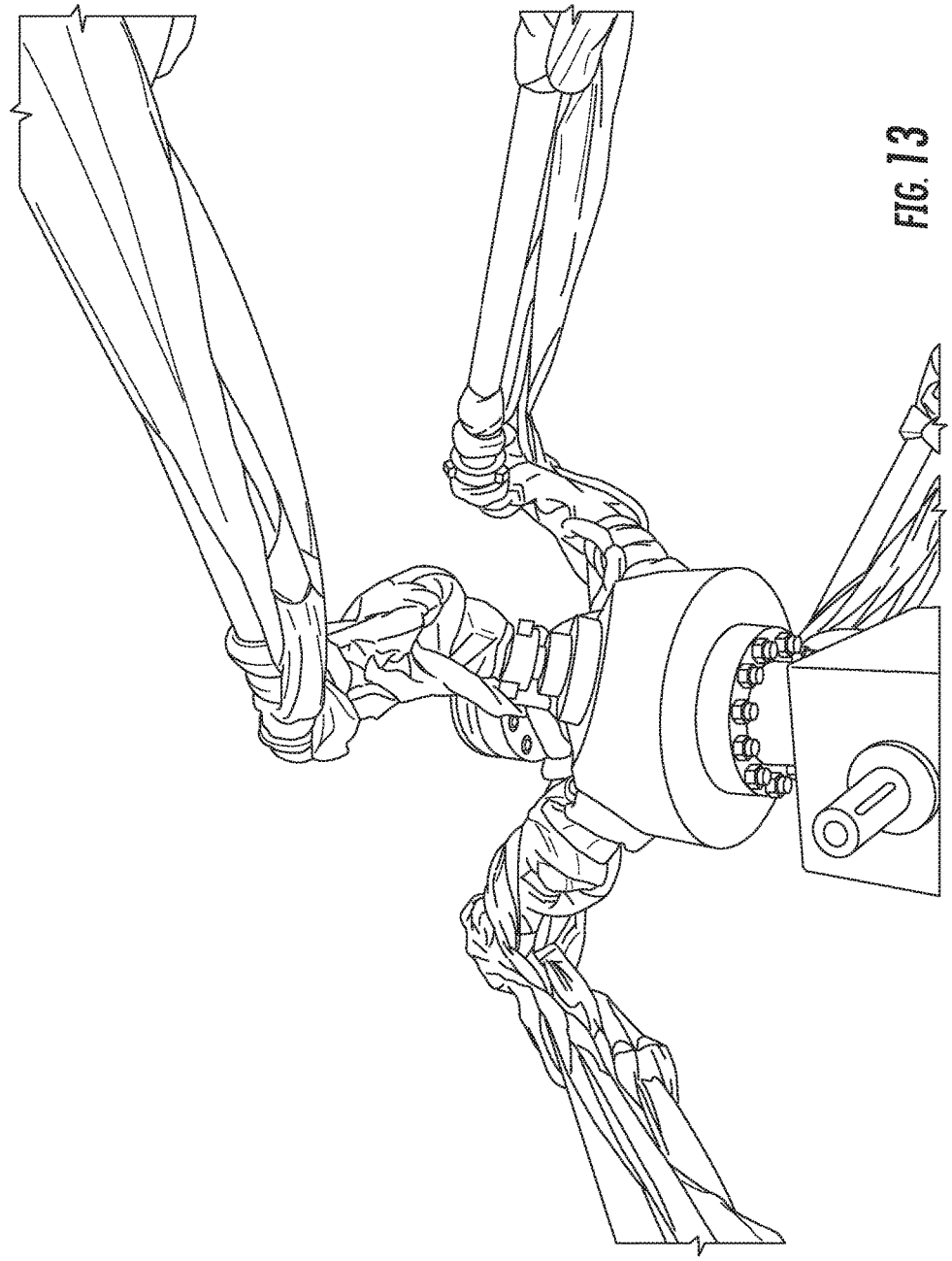
Figure 14:
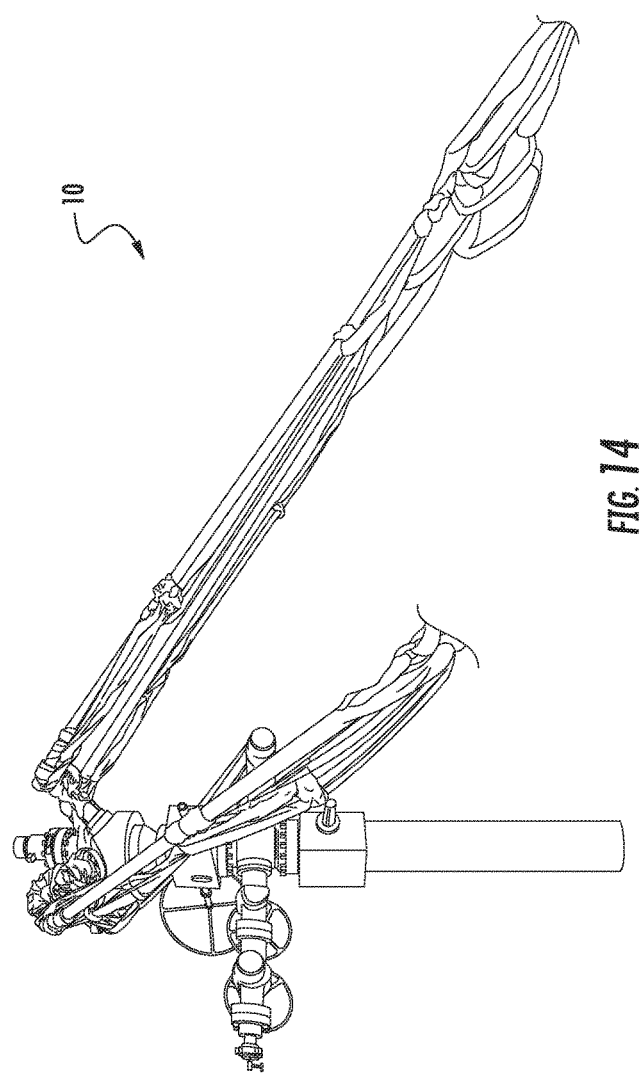
Figure 15:
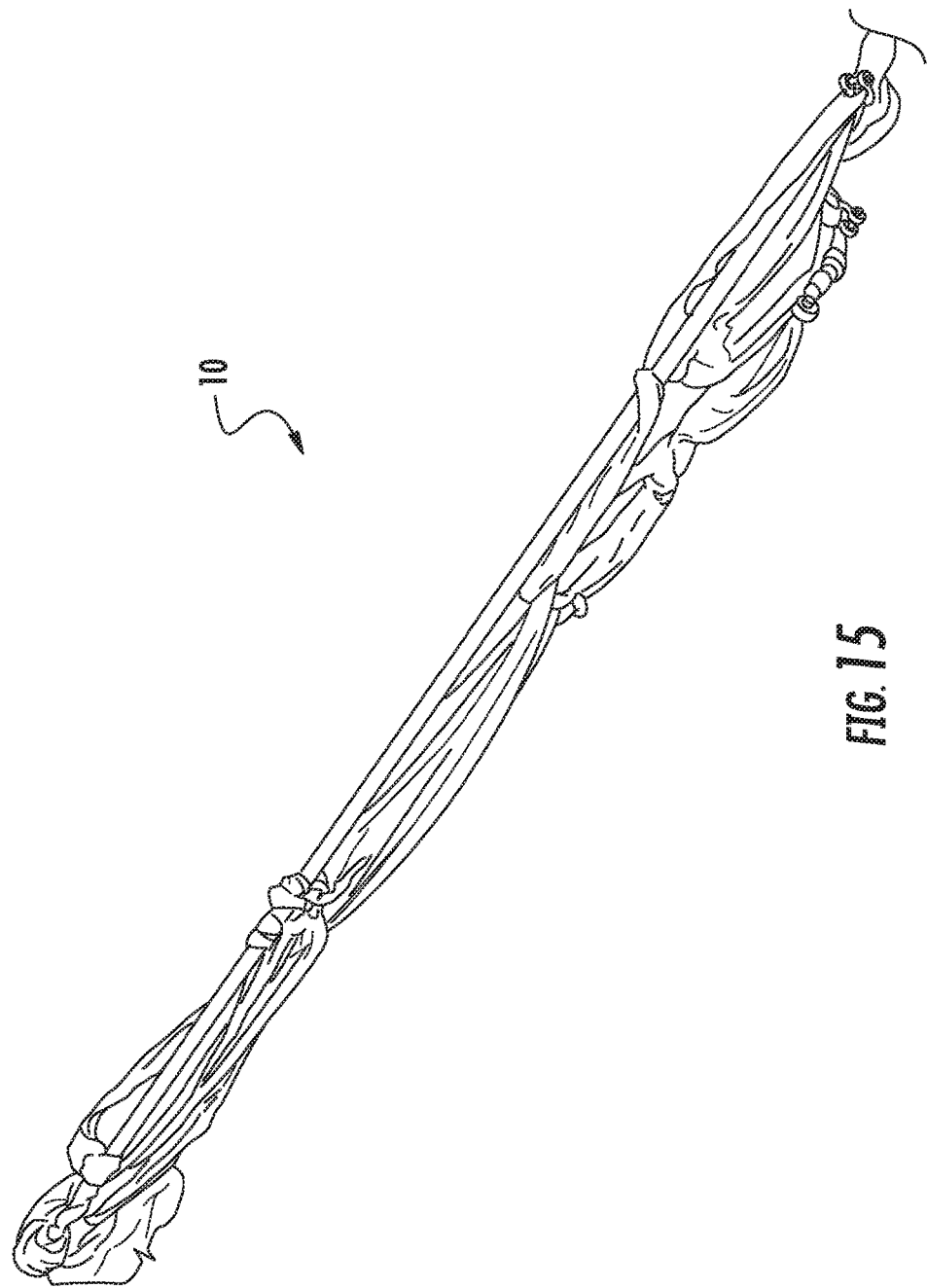

FIGS. 1-17 show a preferred embodiment of the apparatus of the present invention designated generally by the numeral 10 in FIGS. 1-15. Restraint system 10 is used to secure a high pressure flow line 11 that can be comprised of a plurality of pipe sections 12, 13 and fittings 14 (e.g., couplings, valves, elbows, tees or other fittings).

Two (2) pipe sections 12, 13 are usually connected at fitting 14. However, the term "fitting" as used herein should be construed broadly to include anything that can be part of piping system or flowline. Fitting includes but is not limited an elbow, tee, reducer, valve, coupling, union, as examples. In such a high pressure flow line 11, multiple pipe sections are typically connected end to end with unions or couplings. The flow line 11 can include straight sections of pipe, elbow or bend sections, tee fittings and the like.

A fitting 14 (e.g., a coupling such as a hammer union 14, which is commercially available) can be used to join a pair of pipe sections 12, 13 together. Such hammer unions, couplings or like fittings 14 are known in the art. Coupling 14 can provide a hammer nut 15 having projections 16 which can be pounded with a hammer to insure a tight seal for the connection of coupling or fitting 14 when it is used to join two pipe sections 12, 13 together. An example of a hammer union and seal arrangement can be seen in U.S. Pat. No. 6,764,109 entitled "Hammer Union and Seal Therefor". U.S. Pat. No. 6,764,109 is hereby incorporated herein by reference.

Figure 16:
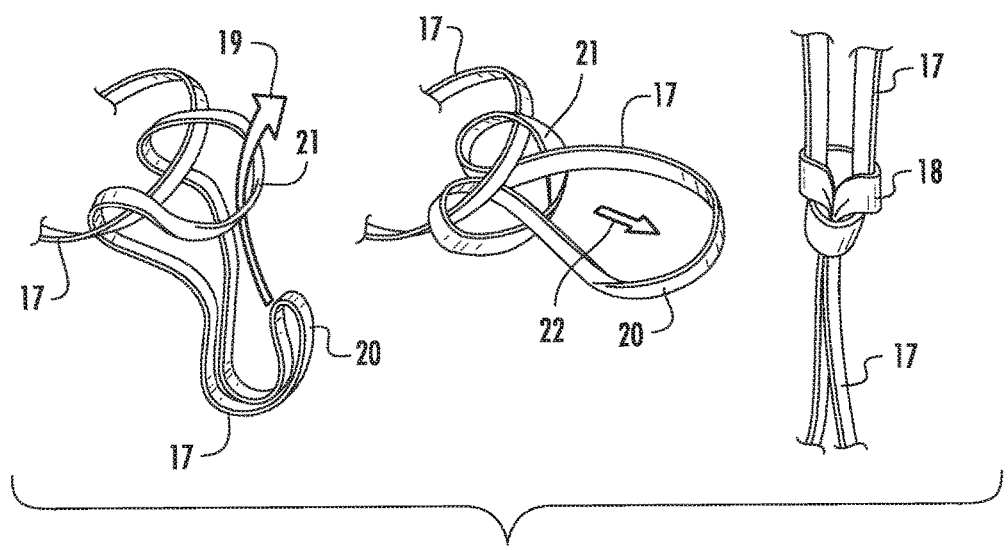
FIGS. 16-17 are fragmentary perspective views that show a cow hitch, sling hitch or girth hitch connection of one endless loop sling to another endless loop sling.
Figure 17:
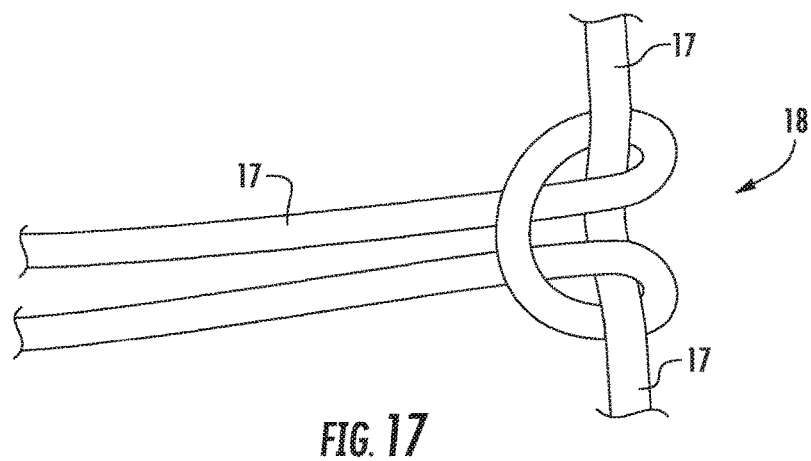

In FIGS. 16-17, there can be seen a knotted connection, such as a cow hitch or girth hitch knot 18 that joins one endless loop sling to another endless loop sling. The slings 17 are connected end to end. Every few slings, the connection is with a shackle 23 or other disconnectable connector. The knot 18 of FIGS. 16-17 can be perfected by forming a first loop 20 and passing it through a second loop 21 as indicated by arrow 19 and pulling the first loop 20 through the second loop 21 as indicated by arrow 22. The assembled slings 17 connected with knot 18 can be seen in FIGS. 16-17.

Once two or more slings 17 are connected end to end as seen in FIG. 16, an assembly of such slings 17 (e.g., three slings connected end-to-end) is connected to another assembly of slings (e.g., three slings connected end-to-end) with a disconnectable connector such as a shackle 23. Shackle 23 has two separable parts, bow 24 and pin 25. Such shackles are commercially available. In this fashion, if a leak is detected, only two shackles 23 on opposing sides of the leak need be disconnected as opposed to all of the slings 17.

The assemblies of slings 17 are knotted to the pipe and fittings at selected intervals using half hitch or other knots.

The following is a list of parts and materials suitable for use in the present invention:

PARTS LIST

| PART NUMBER | DESCRIPTION |
| --- | --- |
| 10 | restraint system |
| 11 | high pressure flow line |
| 12 | pipe section |
| 13 | pipe section |
| 14 | coupling/hammer union/fitting |
| 15 | hammer nut |
| 16 | projection |
| 17 | endless loop sling |
| 18 | cow hitch/knot girth hitch knot/sling hitch knot/knotted connection |
| 19 | arrow |
| 20 | first loop |
| 21 | second loop |
| 22 | arrow |
| 23 | shackle/disconnectable connector |
| 24 | bow |
| 25 | pin |

All measurements disclosed herein are at standard temperature and pressure, at sea level on Earth, unless indicated otherwise. All materials used or intended to be used in a human being are biocompatible, unless indicated otherwise.

The foregoing embodiments are presented by way of example only; the scope of the present invention is to be limited only by the following claims.

The invention claimed is:

1. A restraint system for use in securing temporary flowlines that include multiple pipe sections, said sections connected together with fittings, the system comprising:

a) a first assembly of multiple endless loop slings connected end-to-end, said slings of said first assembly including at least first and second endless loop slings, wherein said first assembly is defined by each said first and second sling having first and second end portions that are secured to one or more other endless loop slings of said first assembly with a first assembly knot;

b) wherein each said first sling assembly knot joins the first end of the first said sling to the second end of the second said sling;

c) one or more disconnectable fittings that join said first assembly of multiple endless slings to a second assembly of multiple endless slings;

d) wherein said second assembly having third and fourth endless loop slings, each said third and fourth endless loop sling having first and second end portions that are secured to one or more other endless loop slings of said second assembly with a second assembly knot;

e) wherein each said second sling assembly joins the first end of the third said sling to the second end of the fourth said sling;
f) wherein the one or more disconnectable fittings are not endless loop slings; and
g) each said assembly of endless loop slings is attached to the temporary flowline at intervals with attachments;
h) the slings of each said assembly of slings formed into said attachments at spaced apart intervals, each said attachment including a sling knot that is part of a sling of each said assembly, wherein each sling knot encircles the flowline to secure a said sling to the temporary flowline, wherein the sling knots are at spaced apart positions along the temporary flow line; and
i) wherein each sling knot is located in between the disconnectable fittings, wherein at one or more of said knots the assembly extends in opposing directions to other said sling knots.

2. The restraint system of claim 1 wherein the disconnectable fitting is a shackle.

3. The restraint system of claim 1 wherein the said attachments include each endless loop sling wrapped around the temporary flow line with at least one 360° wrap.

4. The restraint system of claim 1 where there are at least three endless loop slings in each assembly.

5. The restraint system of claim 1 wherein each endless loop sling assembly encircles a pipe section next to a fitting.

6. A restraint system for use in securing temporary flowlines that include multiple pipe sections, each pair of sections connected together with fittings, the system comprising:
a) a first assembly of endless loop slings connected end-to-end, each endless loop sling of said first assembly having spaced apart loop end portions secured to one or more other endless loop slings with a knot;
b) a second assembly of endless loop slings connected end-to-end, each endless loop sling of said second assembly having spaced apart loop end portions secured to one or more other endless loop slings with a loop assembly knot;
c) a disconnectable fitting that joins said first assembly of endless loop slings to said second assembly of endless loop slings;
d) wherein the disconnectable fitting is not a said endless loop sling;
e) the said first and second assemblies connected to the flowlines at intervals using a portion of a said endless loop sling of a said assembly to make a sling knot that encircles the temporary flow line, and wherein at the said sling knot each said assembly extends in opposing directions to other said sling knots; and
f) wherein each said sling knot is defined by a said endless loop sling of a said assembly being both wrapped around and knotted to said temporary flow line at a position that is located in between two said spaced apart loop end portions.

7. The restraint system of claim 6 wherein the disconnectable fitting is a shackle.

8. The restraint system of claim 6 wherein each endless sling is tied to the piping system at intervals with knots that are half hitch knots.

9. The restraint system of claim 6 where there are between 2 and 12 endless loop slings in each assembly of endless loop slings.

10. The restraint system of claim 6 wherein each knot is positioned next to a fitting.

11. A restraint system for use in securing a temporary flowline that includes multiple pipe sections, each pair of said sections connected together with fittings, the system comprising:
a) a first sling assembly defined by first and second endless loop slings that are connected end-to-end, each loop sling of said first assembly having spaced apart end portions wherein an end portion of said first endless loop sling is connected with an assembly knot to a second endless loop sling to define said first assembly of loop slings;
b) a second loop sling assembly;
c) a disconnectable fitting that joins one of the loop slings of the first assembly of loop slings to one of the loop slings of the second assembly of multiple loop slings;
d) wherein the disconnectable fitting is not a said loop sling;
e) wherein each said assembly of loop slings is connected to the flowline at intervals by tying one or more of said slings to the flowline with a sling knot that encircles the flowline with the said sling; and
f) wherein one or more of the slings contacts and encircles the temporary flowline with a said sling knot at a position that is spaced in between said end portions.

12. The restraint system of claim 1 wherein each endless sling is tied to the piping system at intervals with knots that are half hitch knots.

13. The restraint system of claim 12 wherein the disconnectable fitting is a shackle.

14. The restraint system of claim 12 wherein each loop sling assembly encircles a pipe section next to a fitting.

15. The restraint system of claim 12 where there are between 2 and 12 endless loop slings in each assembly.

16. A restraint system for use in securing a temporary flowline that includes multiple pipe sections, each pair of said sections connected together with fittings, the system comprising:
a) a first endless loop sling assembly having multiple slings that are connected end-to-end, each sling having a sling length and sling end portions that are connected to an end portion of one or more other slings;
b) a second endless loop sling assembly having multiple slings that are connected end-to-end, each sling having a sling length and sling end portions that are connected to an end portion of one or more other slings;
c) disconnectable fittings that join at least one of the slings of the first assembly to one of the slings of the second assembly;
d) wherein the disconnectable fitting is not a said sling;
e) each assembly connected to the flowline at intervals at a location in between the loop end portions of a said sling and with a sling knot;
f) each sling knot positioned in between two said sling ends and said sling encircling the flowline at said knot; and
g) wherein one or more of the slings contacts the flowline along a majority of the sling length and wherein each said slings encircles the temporary flowline.

* * * * *